(12) United States Patent
Fattori

(10) Patent No.: US 10,688,703 B2
(45) Date of Patent: Jun. 23, 2020

(54) INJECTION MOLD INSERT

(71) Applicant: Injection Mold Consulting, LLC, Trevose, PA (US)

(72) Inventor: James Gary Fattori, Trevose, PA (US)

(73) Assignee: Injection Mold Consulting, LLC, Trevose, PA (US)

( * ) Notice: Subject to any disclaimer, the term of this patent is extended or adjusted under 35 U.S.C. 154(b) by 71 days.

(21) Appl. No.: 15/727,213

(22) Filed: Oct. 6, 2017

(65) Prior Publication Data

US 2018/0099444 A1 Apr. 12, 2018

Related U.S. Application Data

(60) Provisional application No. 62/404,890, filed on Oct. 6, 2016.

(51) Int. Cl.
*B29C 45/73* (2006.01)
*B29C 31/00* (2006.01)
*B29C 45/30* (2006.01)
*B29C 45/27* (2006.01)

(52) U.S. Cl.
CPC ........ *B29C 45/7312* (2013.01); *B29C 31/002* (2013.01); *B29C 45/2703* (2013.01); *B29C 45/30* (2013.01)

(58) Field of Classification Search
CPC .............. B29C 45/7312; B29C 31/002; B29C 45/2703; B29C 45/30; B01F 5/0602; B01F 5/0614; B01F 2005/0625; B01F 2005/0639

See application file for complete search history.

(56) References Cited

U.S. PATENT DOCUMENTS

| | | | | |
|---|---|---|---|---|
| 4,966,544 A * | 10/1990 | Mitake | ................ | B29C 45/7312 249/111 |
| 5,513,976 A * | 5/1996 | McGrevy | ................ | B29C 45/30 264/328.15 |
| 5,830,515 A * | 11/1998 | Pleasant | .............. | B29C 45/7312 425/192 R |
| 6,604,933 B1 * | 8/2003 | Kern | ....................... | B29C 45/20 264/328.15 |
| 6,752,618 B2 * | 6/2004 | Dewar | ................ | B29C 45/2806 425/564 |

(Continued)

FOREIGN PATENT DOCUMENTS

| | | | | |
|---|---|---|---|---|
| DE | 3936208 C1 * | 1/1991 | ............. | B29C 45/27 |
| EP | 0077130 A1 * | 4/1983 | ............ | B01F 5/0614 |
| EP | 0311409 A1 * | 4/1989 | ............ | B01F 5/0614 |

OTHER PUBLICATIONS

Machine Translation DE3936208 (Year: 1991).*

*Primary Examiner* — Matthew J Daniels
*Assistant Examiner* — Wayne K. Swier
(74) *Attorney, Agent, or Firm* — LaMorte & Associates, P.C.

(57) ABSTRACT

The invention relates generally to injection mold components, and more specifically an injection mold material flow channel configured with at least one fin projecting inwardly from an inner surface of the melt channel. An injection molding insert may be made for insertion within a flow path of an injection mold components and include a substantially tubular body defining a channel; and at least one fin projecting inwardly from an inner surface of the channel.

12 Claims, 20 Drawing Sheets

(56) References Cited

U.S. PATENT DOCUMENTS

Figure 1:
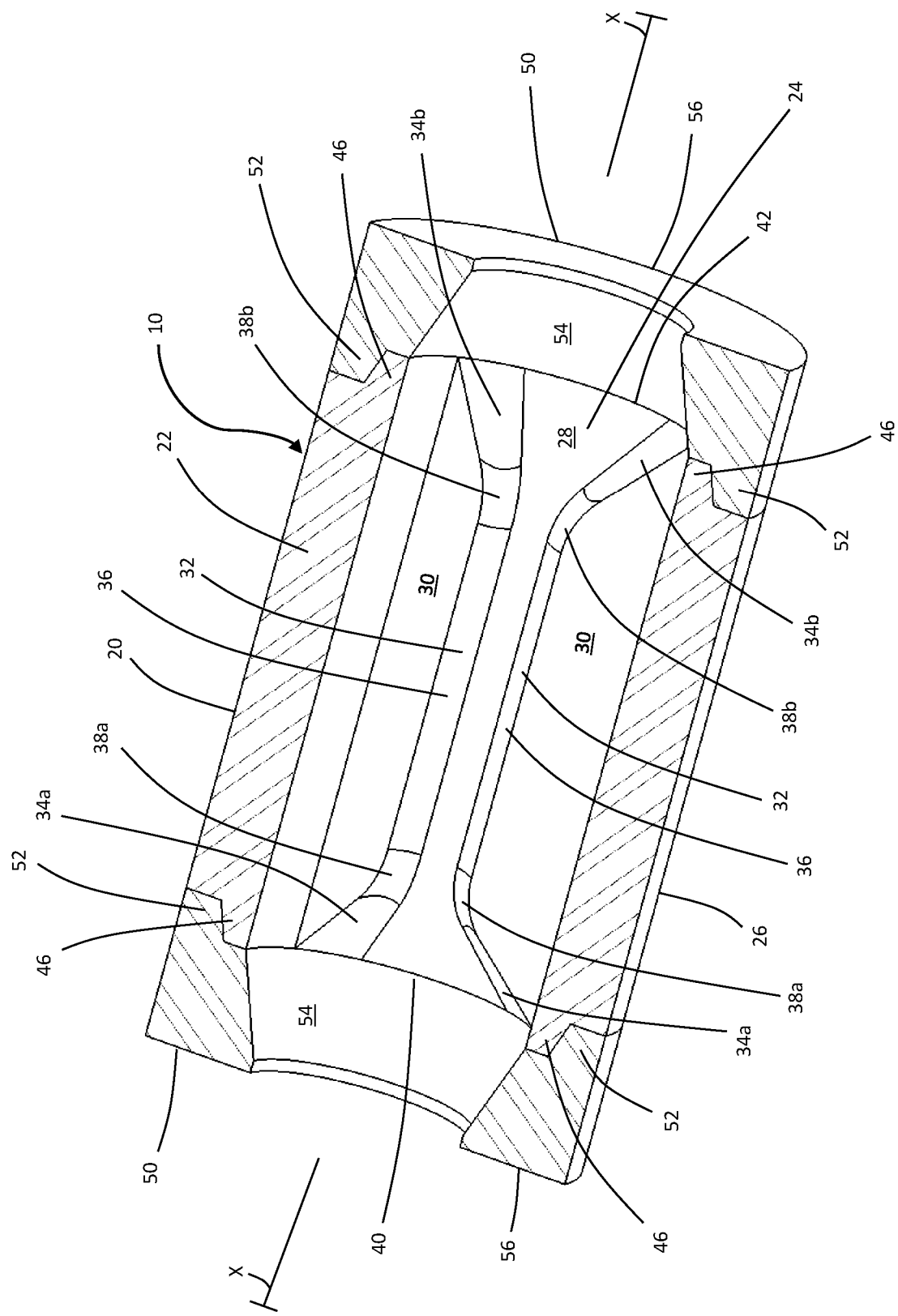

| | | | |
|---|---|---|---|
| 2007/0003661 A1* | 1/2007 | Ciccone | B29C 45/278 425/564 |
| 2013/0286769 A1* | 10/2013 | Baron | B01F 5/0618 366/337 |
| 2014/0117576 A1* | 5/2014 | Hanaoka | B29C 45/30 264/69 |
| 2017/0057138 A1* | 3/2017 | Fattori | B29C 45/20 |

* cited by examiner

US 10,688,703 B2

INJECTION MOLD INSERT

BACKGROUND

Injection molding is a well-known process that involves melting solid thermoplastic molding material within a heated machine barrel assembly mounted on a moveable carriage, and transmitting the molding material into a cavity formed within an injection mold. The molding material takes on the shape of the cavity and then solidifies to form a finished part. The mold then opens and the process may be repeated to form additional parts.

The molding material may be solid, semi-rigid, or molten at various stages of an injection molding operation, and while a nozzle tip (the heated machine barrel assembly includes a nozzle having a tip that engages a complimentary nozzle seat formed in the injection mold) may contain molding material in any or all of these physical states, there will always be at least some semi-rigid material located between solid and molten molding material. Crystalline thermoplastic materials will typically have a small amount of semi-rigid material between the other two states, while amorphous thermoplastic materials typically contain a considerably larger amount of semi-rigid material. Control of these three physical states and their location within the nozzle tip is critical to the performance of the molding process.

Shear induced melt imbalance is a common challenge in injection molding runner systems. In both cold and hot runner molds, molding material travels through a bore or hole as it moves between the molding machine nozzle tip and the mold cavity. During this process, molding material contacts the sides of the bore or hole, which increases in temperature as a result of shear, while the temperature in the center of the melt stream remains fairly constant. When the molten molding material makes a 90° turn or comes to a "T," the hotter, less viscous molding material may be moved to one side. This can result in the mold cavities filling at different rates, as well as one side of a given mold cavity filling at a different rate than the other side. A need exists for a device that can overcome this difference and avoid the resultant nonuniformity among molded parts or within sections of the same part.

SUMMARY OF THE EMBODIMENTS

The invention relates generally to injection mold components, and more specifically an injection mold material flow channel configured with at least one fin projecting inwardly from an inner surface of the melt channel.

An injection molding insert may be made for insertion within a flow path of an injection mold components and include a substantially tubular body defining a channel; and at least one fin projecting inwardly from an inner surface of the channel.

BRIEF DESCRIPTION OF THE EMBODIMENTS

Figure 3:
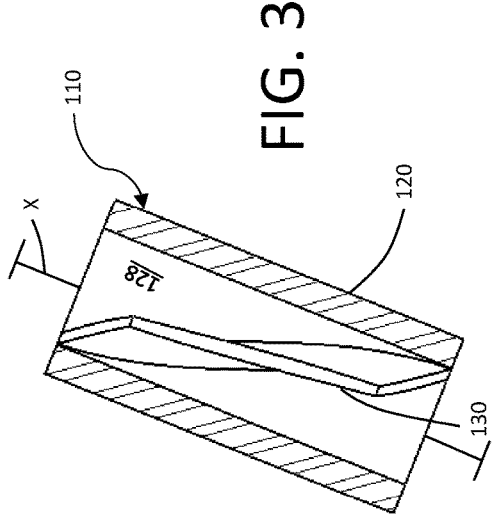
Figure 6:
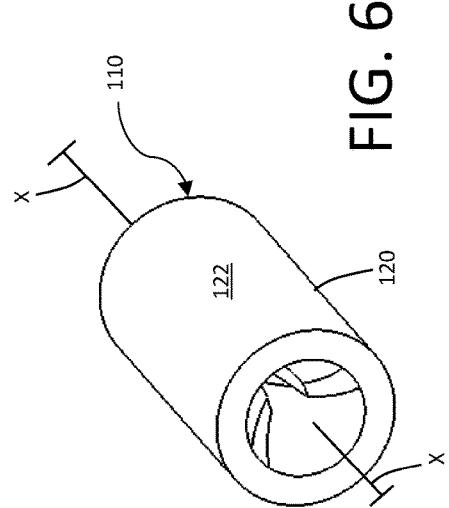
Figure 2:
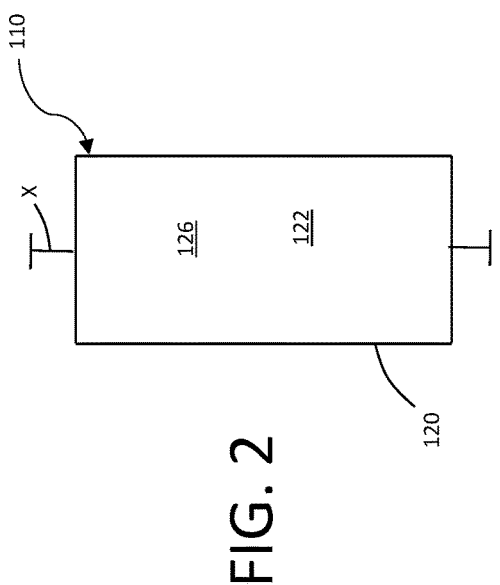
Figure 4:
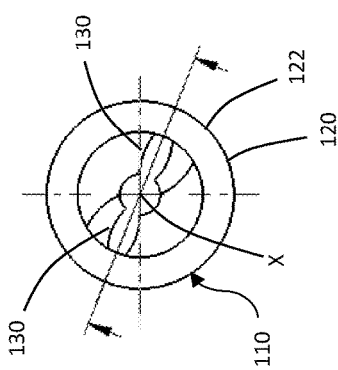
Figure 5:
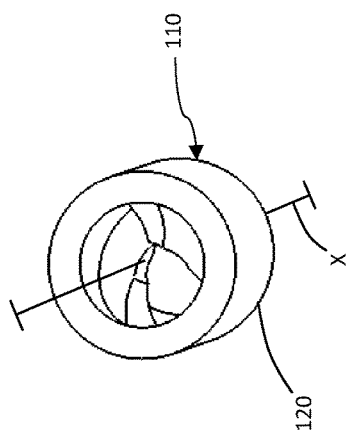
Figure 7:
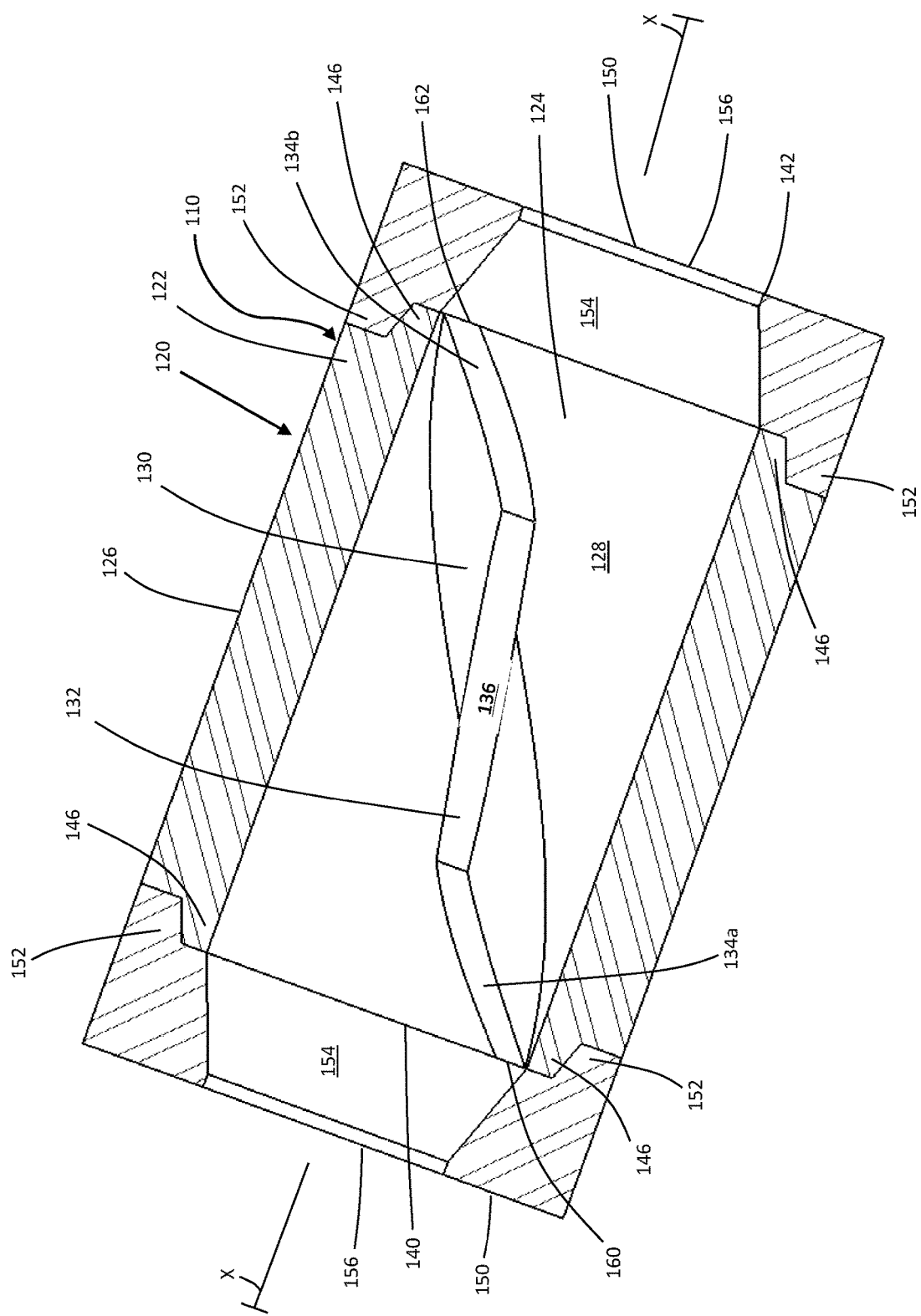
Figure 8:
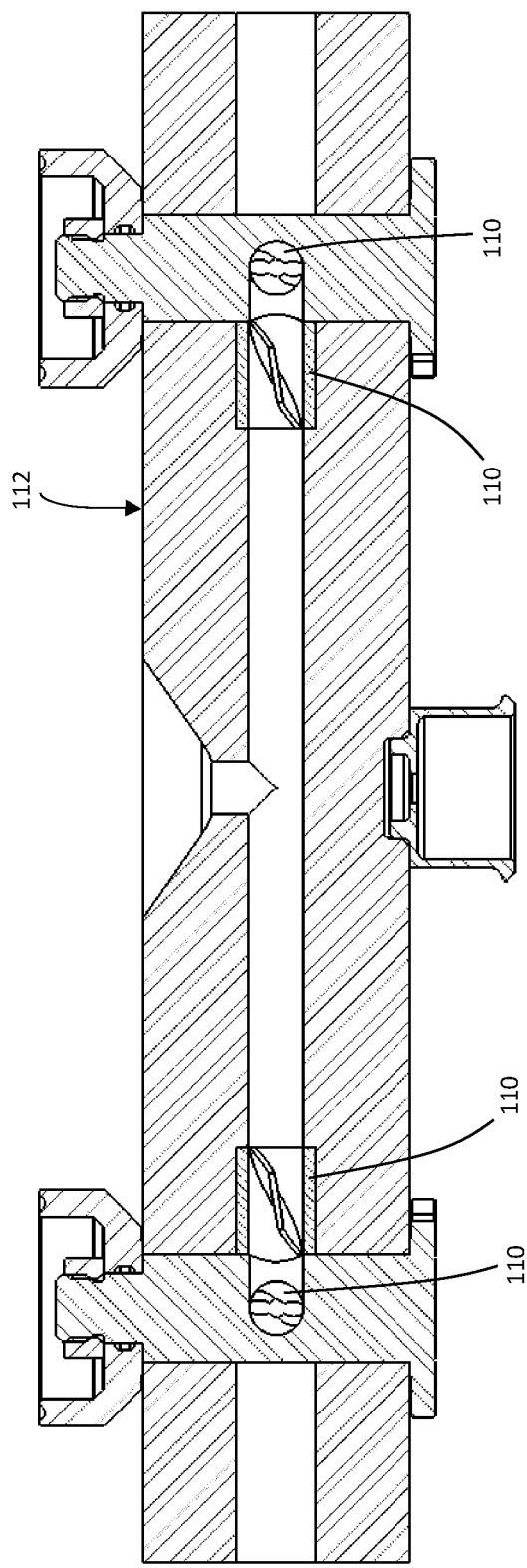
Figure 9:
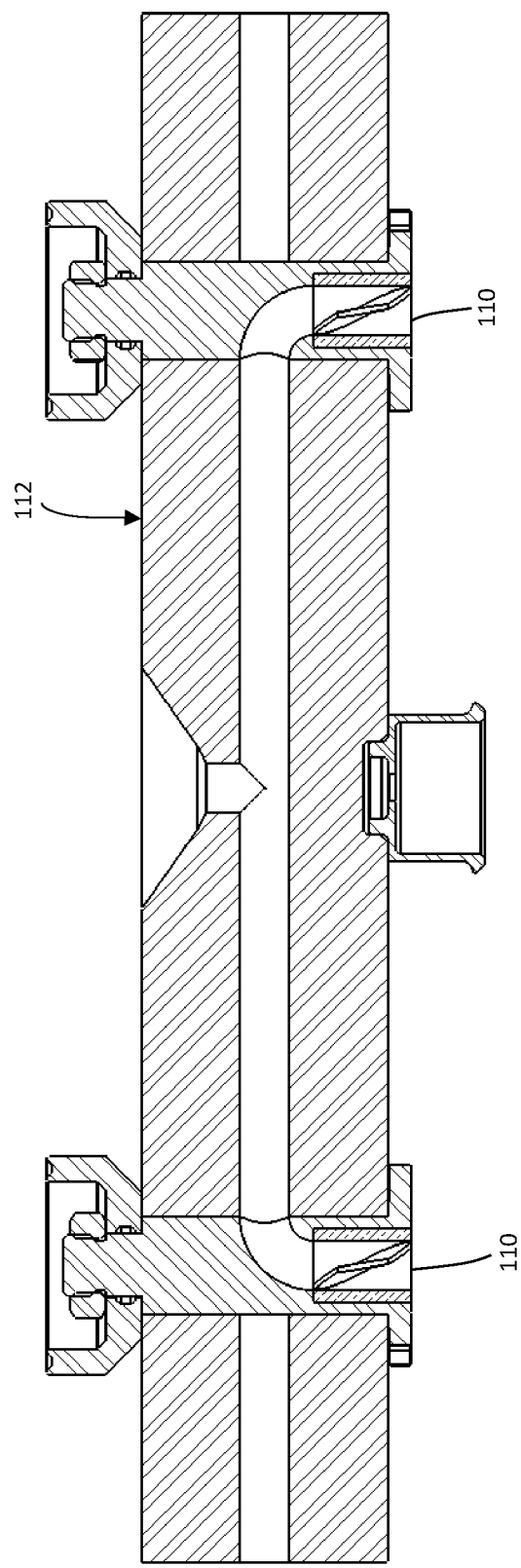
Figure 10:
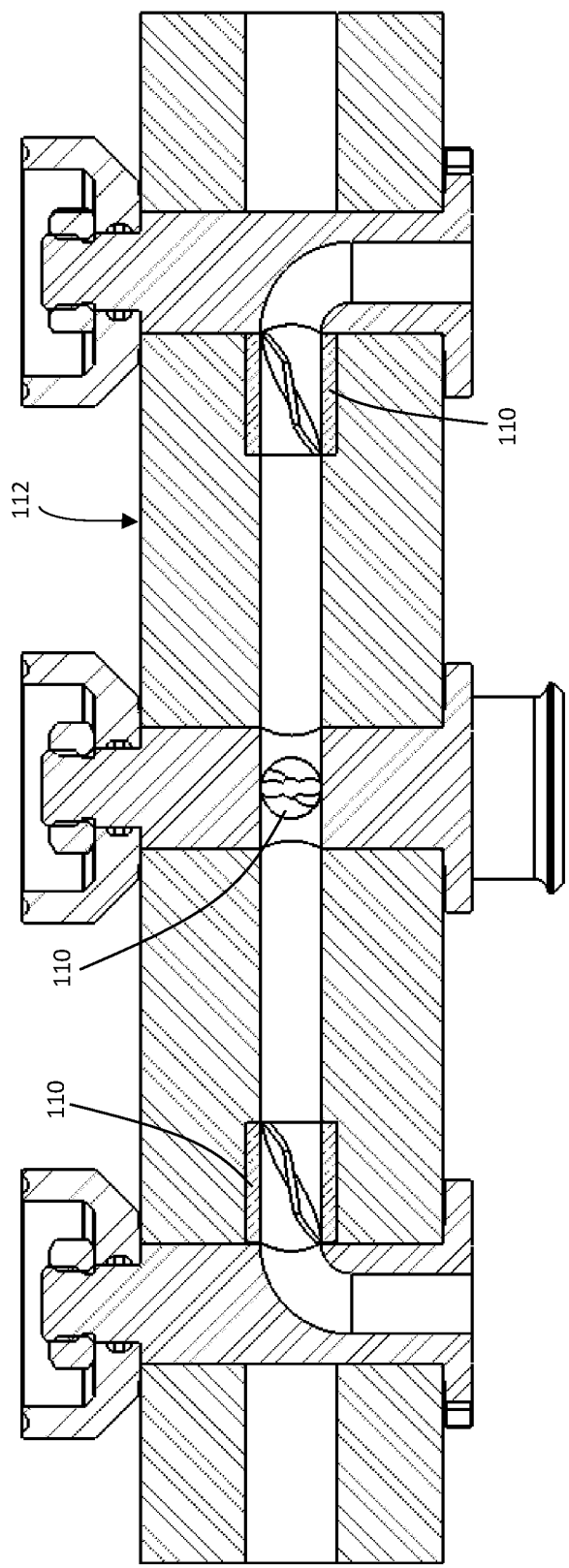
Figure 11:
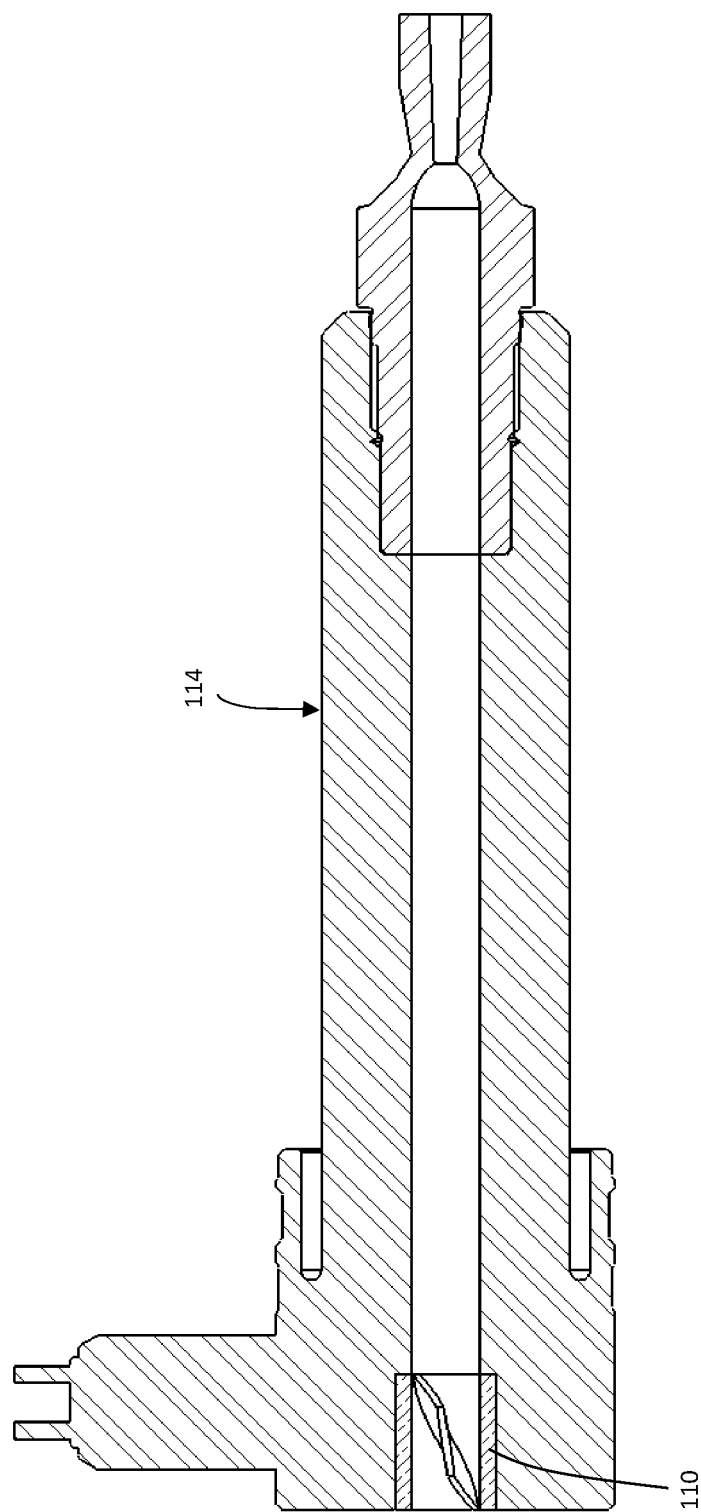
Figure 12:
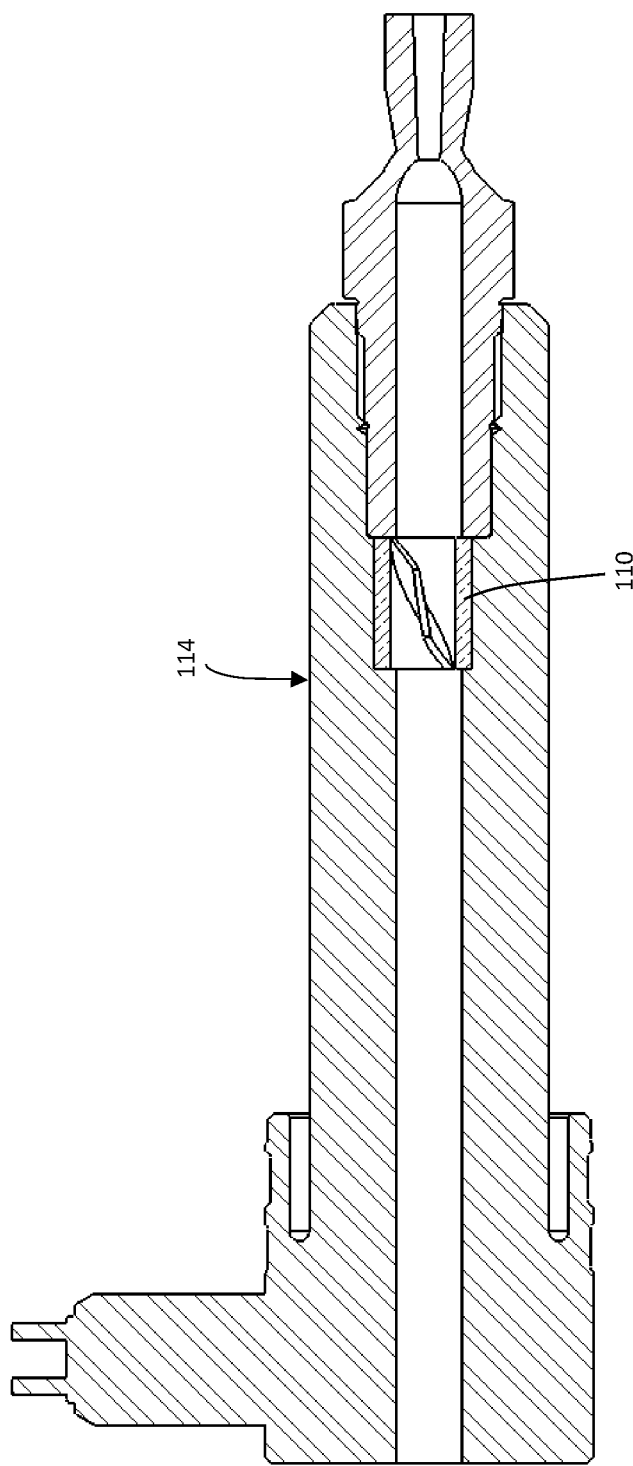
Figure 13:
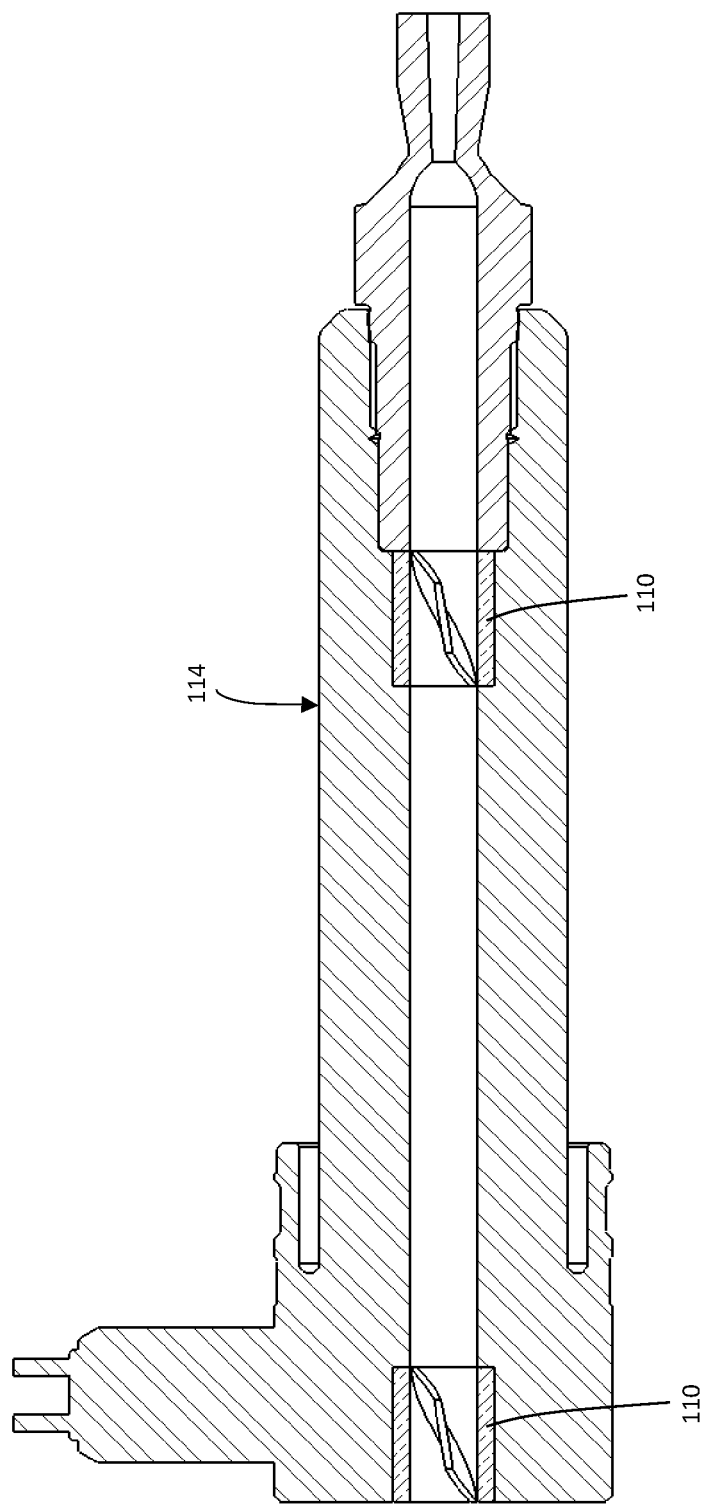
Figure 14:
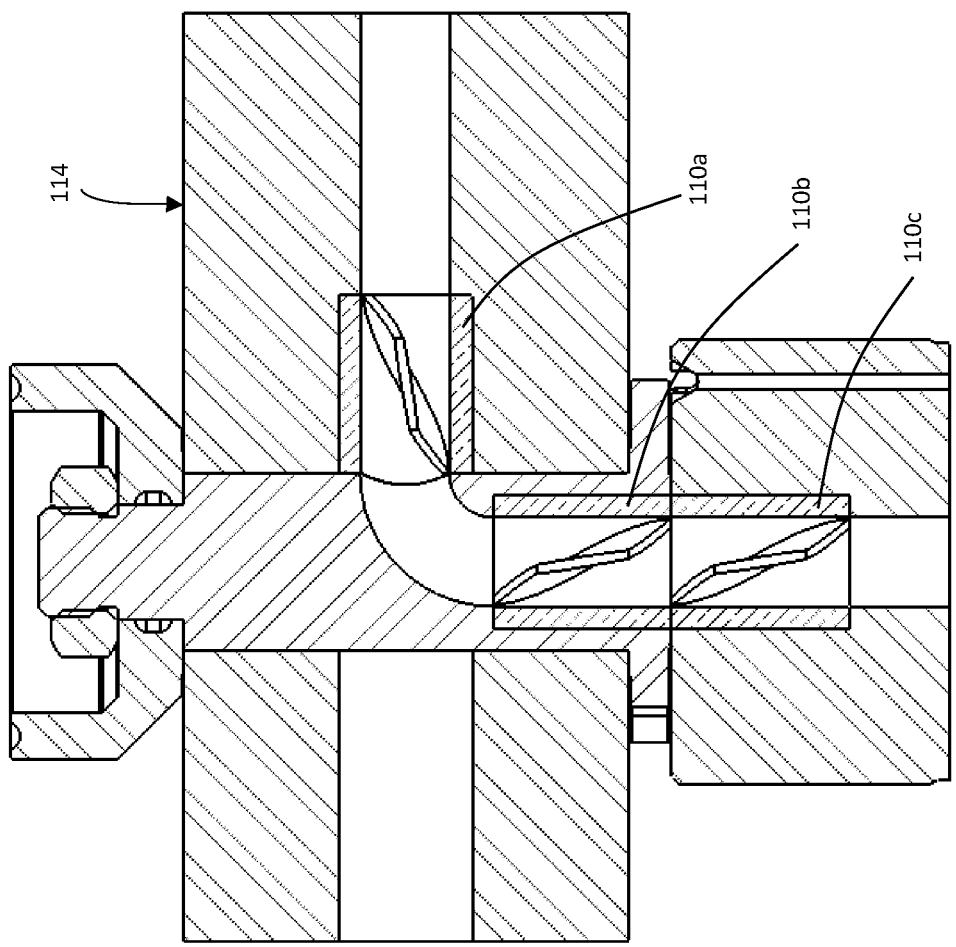
Figure 15:
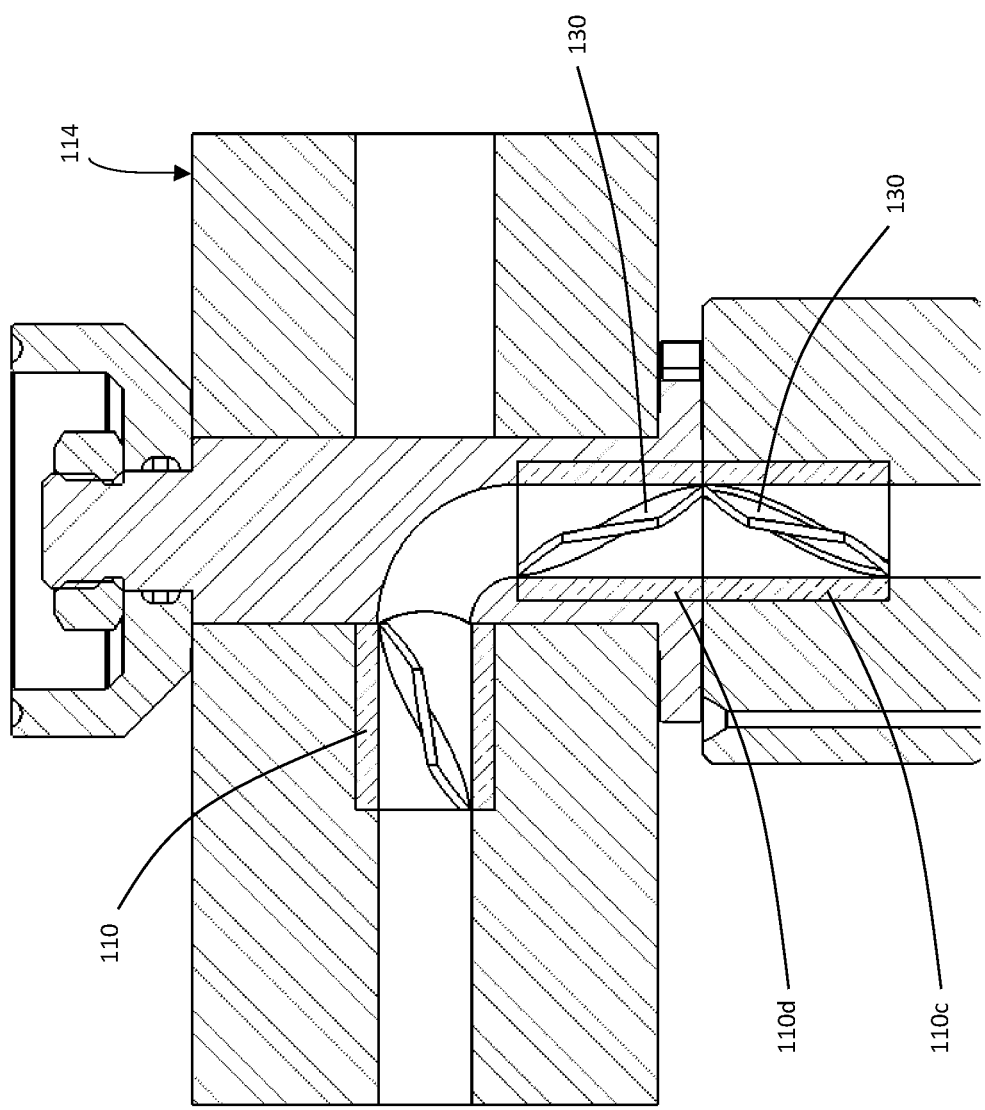
Figure 16:
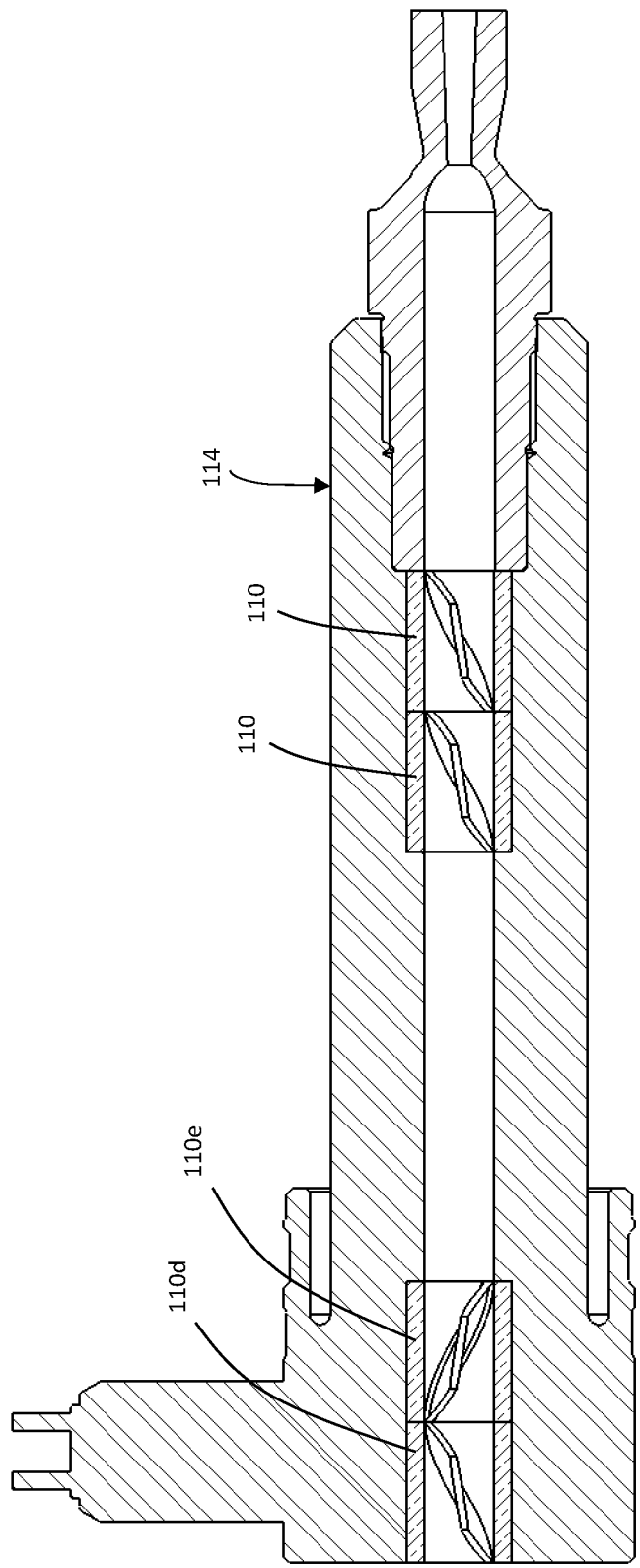
Figure 17:
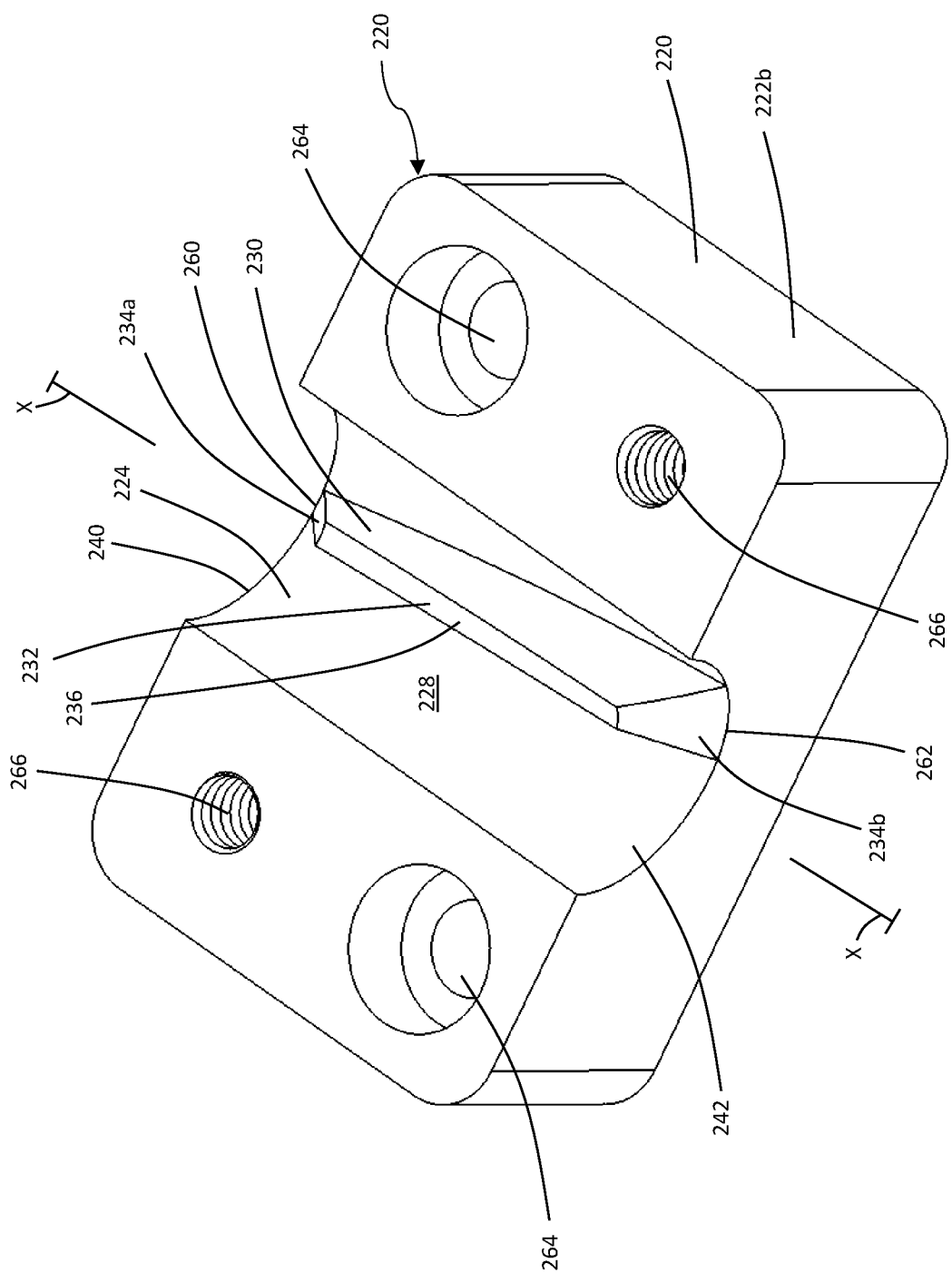
Figure 18:
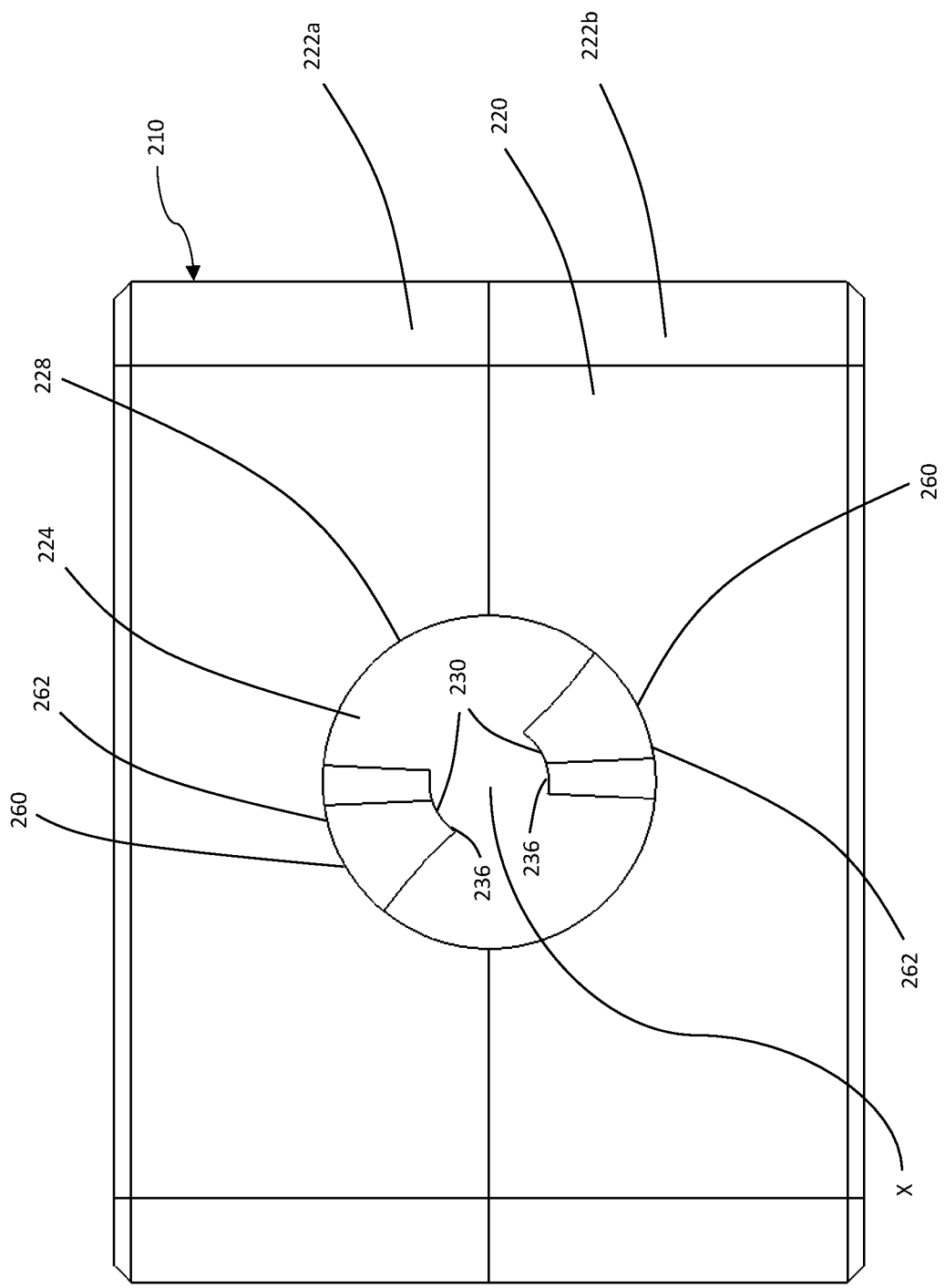
Figure 19:
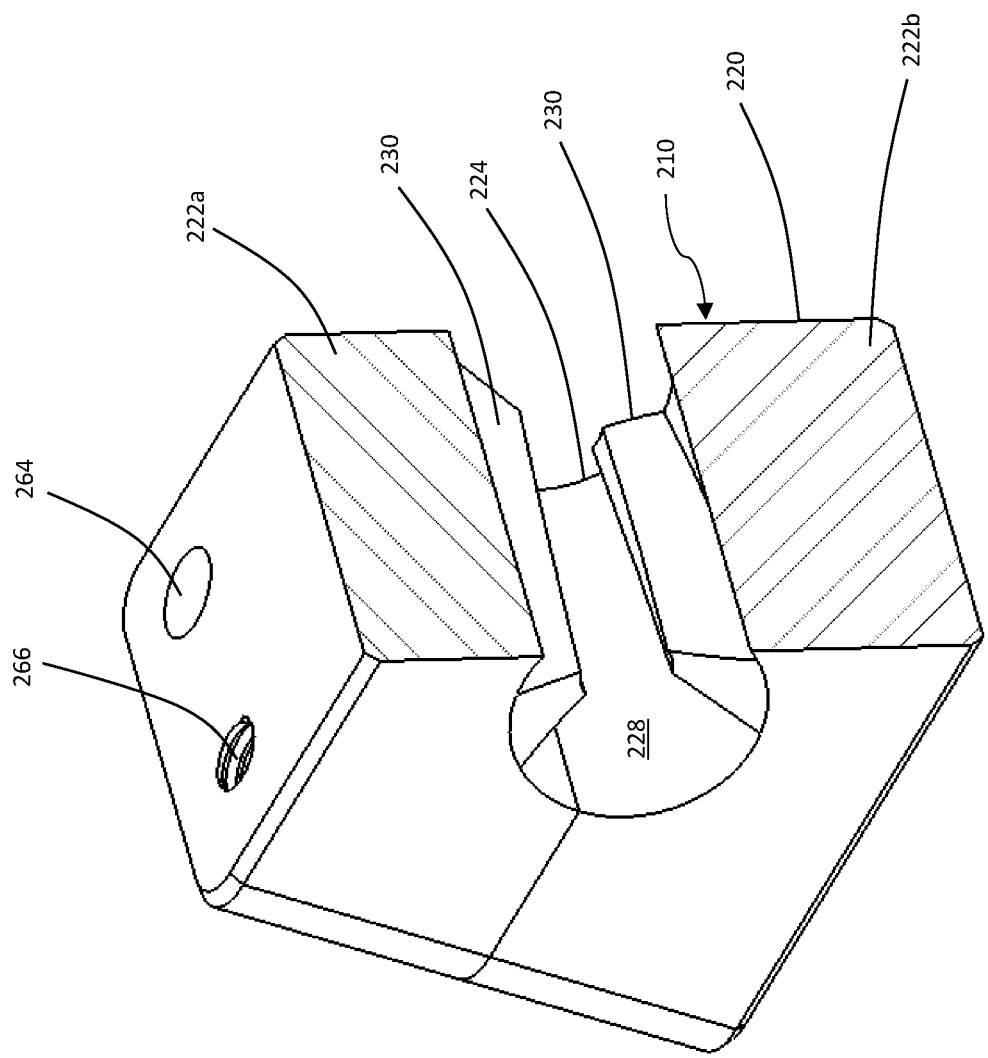
Figure 20:
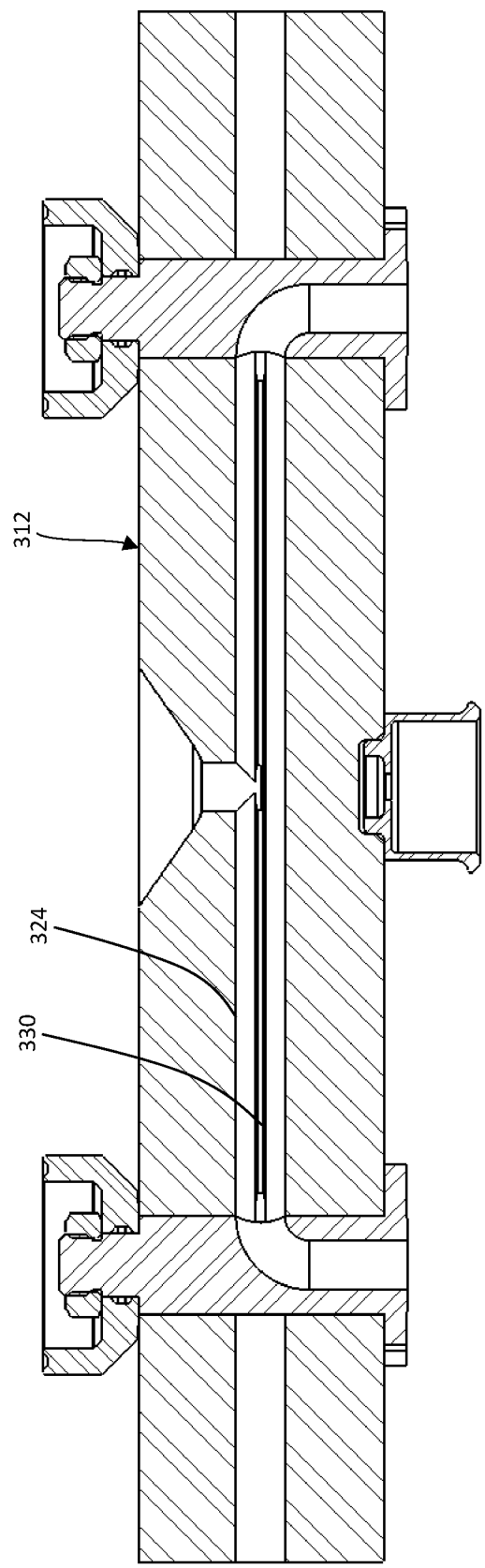
Figure 21:
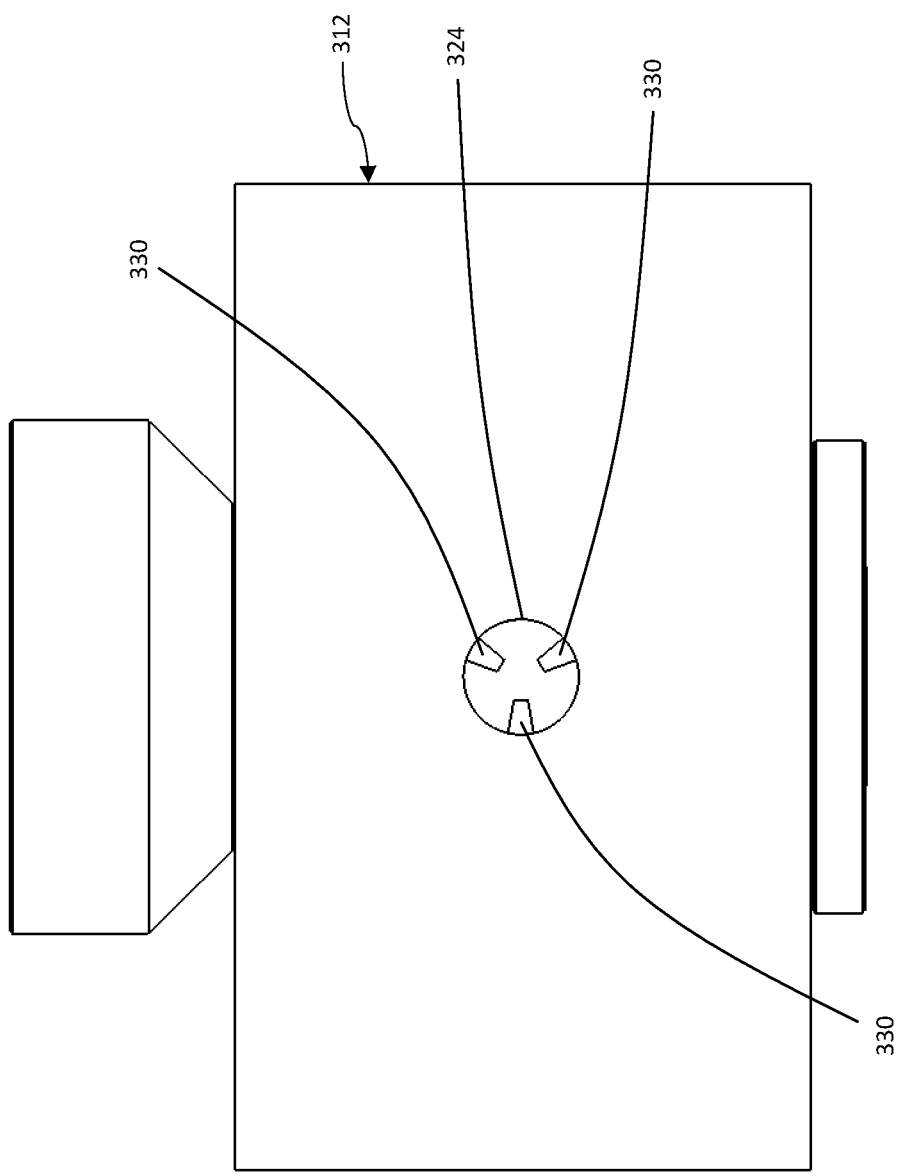
Figure 22:
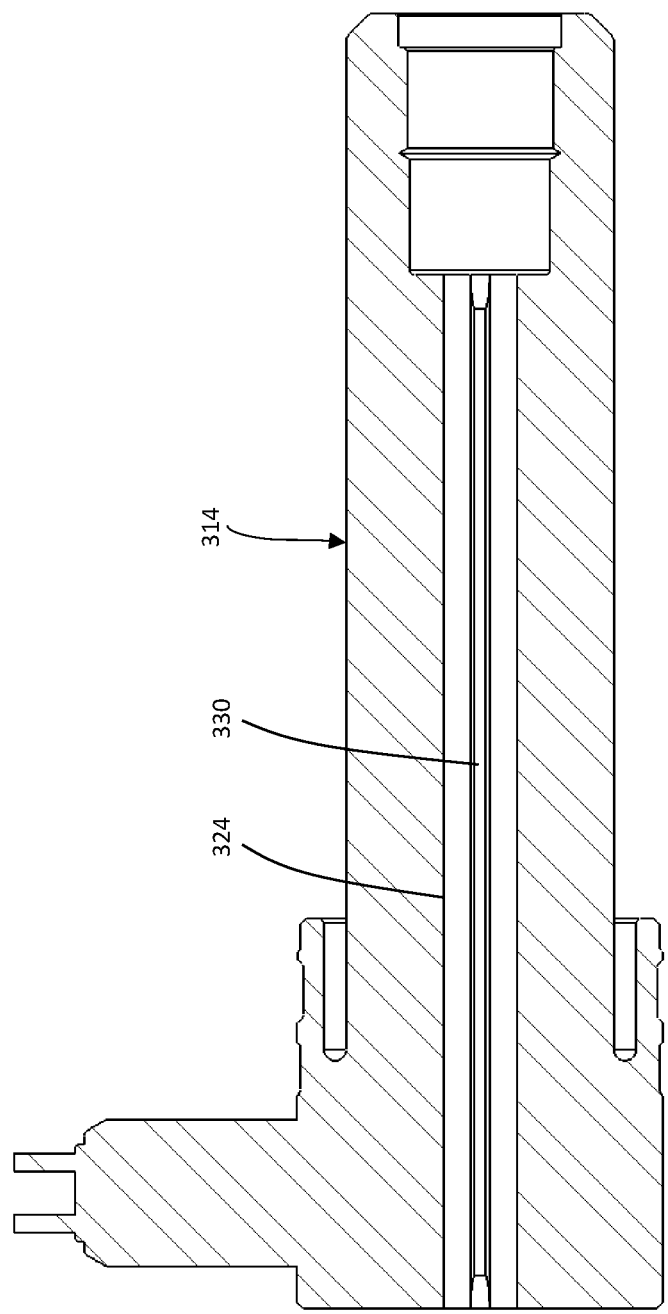
Figure 23:
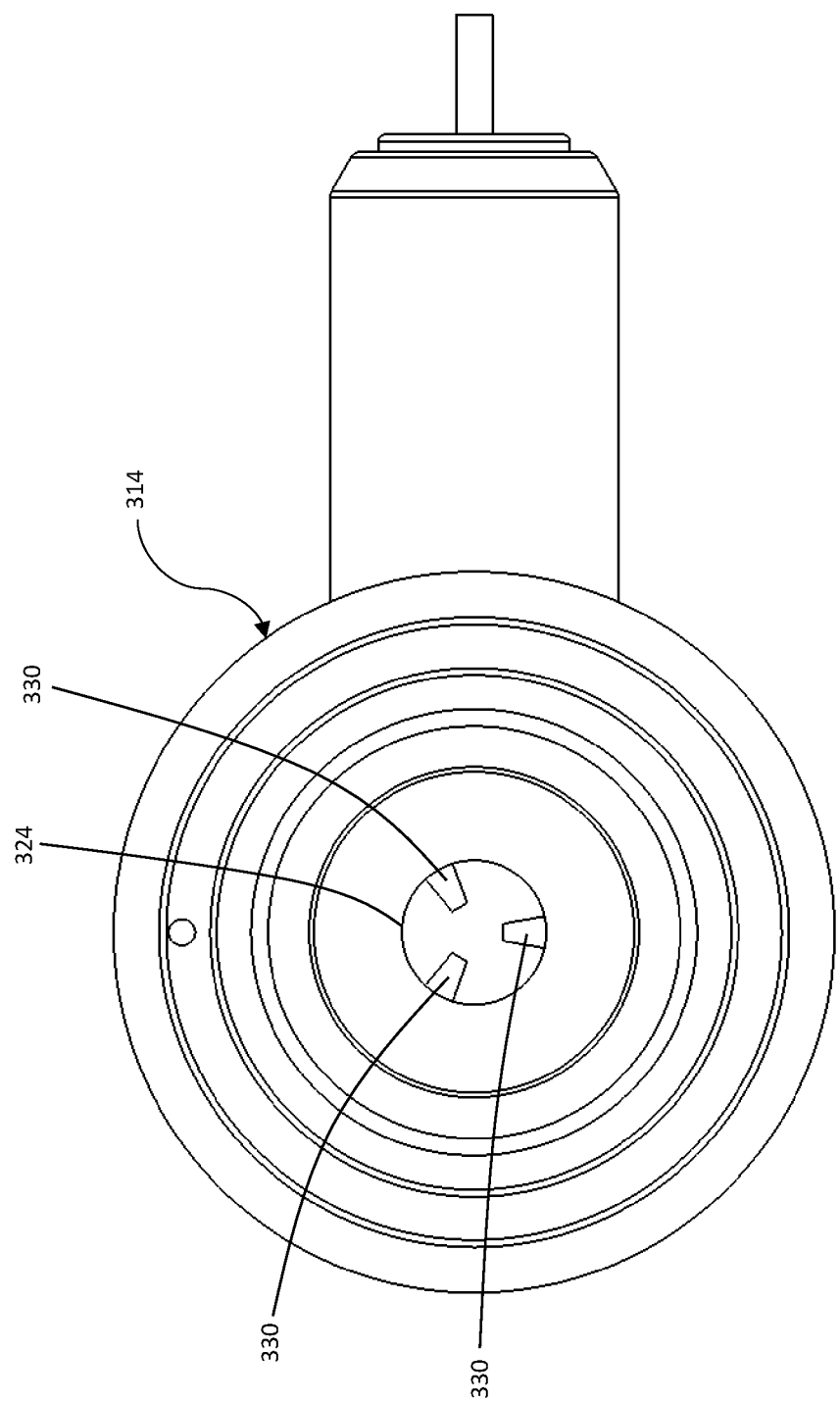
Figure 24:
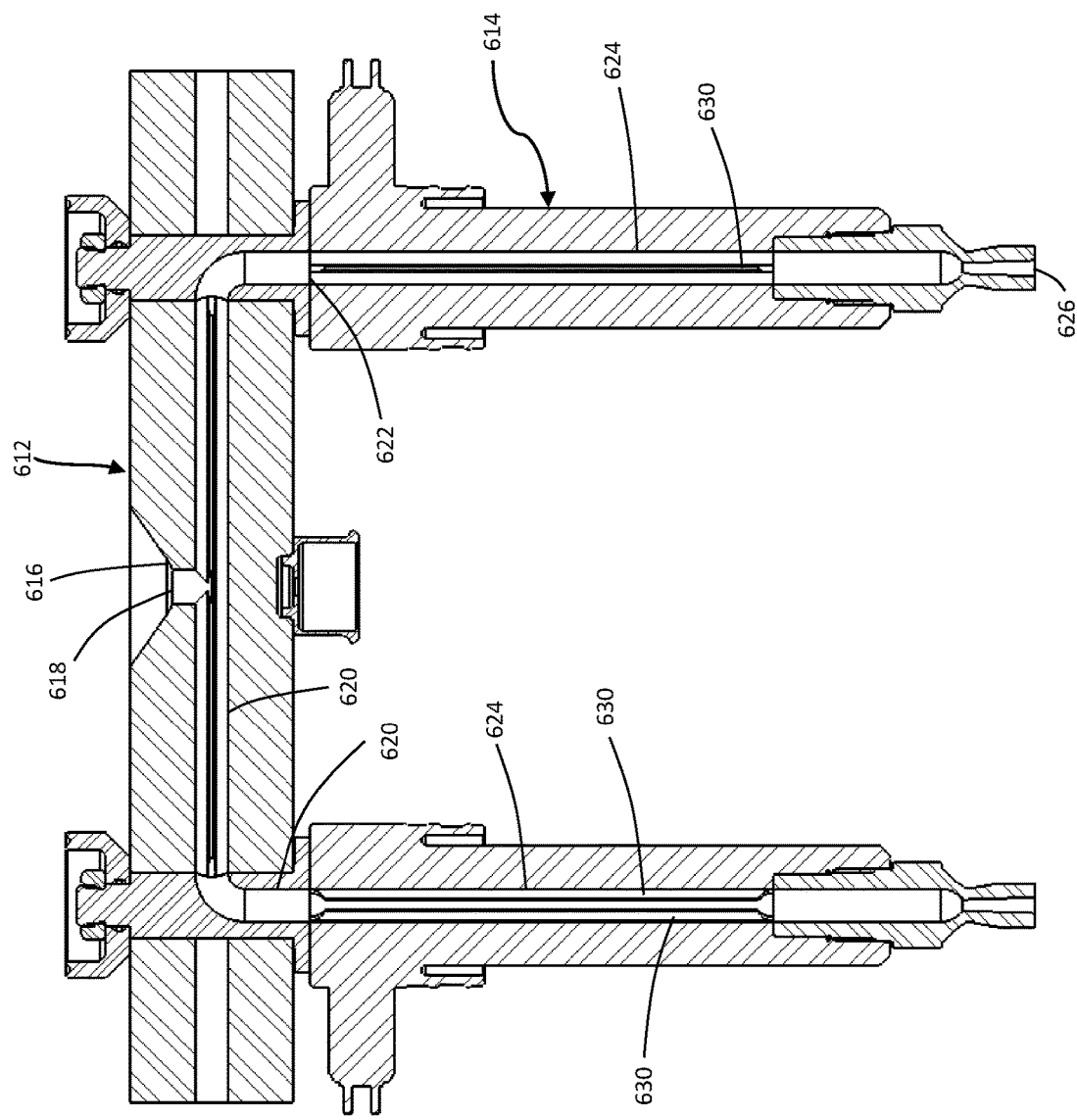

FIG. 1 is a partially cut away perspective view of an embodiment of an insert.
FIG. 2 is a side elevational view of another embodiment of an insert according to the invention.
FIG. 3 is a longitudinal cross sectional view of the insert of FIG. 7.
FIG. 4 is a top plan view of the insert of FIG. 7.
FIG. 5 is a top perspective view of the insert of FIG. 7
FIG. 6 is a side perspective view of the insert of FIG. 7.
FIG. 7 is a cross sectional view of the insert of FIG. 7, shown with end caps.
FIG. 8 is a cross sectional view of a hot runner manifold with inserts in the primary and secondary melt channels.
FIG. 9 is a cross sectional view of a hot runner assembly with inserts located after the runner turns.
FIG. 10 is a cross sectional view of a hot manifold with inserts in the primary and secondary melt channels.
FIG. 11 is a cross sectional view of a hot nozzle and tip with an insert located in the back end thereof.
FIG. 12 is a cross sectional view of a hot nozzle and tip with an insert located in the front end.
FIG. 13 is a cross sectional view of a hot nozzle and tip with inserts located in the front and back ends thereof.
FIG. 14 is a cross sectional view of a hot runner assembly with inserts stacked in series.
FIG. 15 is a cross sectional view of a hot runner assembly with counter rotating inserts for mixing.
FIG. 16 is a cross sectional view of a hot nozzle with multiple rotator inserts located at various positions.
FIG. 17 is an isometric view of a cold runner insert with one fin in one half of a melt channel.
FIG. 18 is an end view cold runner insert assembly with two curved fins in the melt channel.
FIG. 19 is a partially cut away isometric view of a cold runner insert with two fins in the melt channel.
FIG. 20 is a cross sectional view of a hot manifold, showing one of three straight fins in the center or primary bore.
FIG. 21 is a cross sectional end view of a hot manifold with three straight fins in the bore of a melt flow channel.
FIG. 22 is a cross sectional view of a hot nozzle body showing one of three straight fins in the center bore.
FIG. 23 is an end elevational view of a hot nozzle body with three straight fins in the center bore.
FIG. 24 is a cross sectional view of a hot runner assembly with three fins in each of the center bores, with the nozzle on the left showing two fins, and the nozzle on the right showing one fin.

DETAILED DESCRIPTION OF THE EMBODIMENTS

Certain terminology is used in the foregoing description for convenience and is not intended to be limiting. Words such as "front," "back," "top," and "bottom" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 shows an embodiment of an injection mold insert 10, which has a generally tubular body 20 formed of a cylindrical side wall 22 and extending along a longitudinal axis X. The side wall 22 defines a channel 24 that extends along the length of the insert 10 in alignment with the axis X, with first and second openings 40, 42 defined at opposite ends thereof. In use, the insert 10 sits within a portion of a molding assembly with an outer surface 26 of side wall 22 in contact with an interior portion of the molding assembly, such that molten molding material passes through the channel 24 as it flows through the assembly.

Still referring to FIG. 1, the insert 10 includes a plurality of fins 30. Each of the fins 30 extends inward from an inner surface 28 of the side wall 22, towards the central axis X of the insert 10. In the embodiment shown, three fins 30 are provided (only two are shown in the cross sectional view of FIG. 1), and may be evenly spaced about the inner circumference of the side wall 22, for example, separated by 120°.

As shown, each of the fins 30 extends in a straight path, in alignment with the central axis X of the insert 10. Each of the fins 30 may further be divided into an inner segment 32, which is located between first and second outer segments 34A, 34B. Inner segment 32 has a substantially constant height as it extends along the axial direction of the insert 10, i.e. the top surface 36 may be substantially straight and aligned with axis X. Outer segment 34A begins at the first opening 40 and increases in height as it moves in a direction towards the inner segment 32. Likewise, outer segment 34B begins at second opening 42 and increases in height as it moves in a direction towards the inner segment 32. Curved transitional segments 38A, 38B may be formed between the inner segment and each of the outer segments 34A, 34B, to avoid creating a sharp corner between the inner segment 34 and outer segments 34A, 34B that could result in undesirable shear. The fins 30 may further have widths at their bases that are greater than the widths measured near their top surfaces 36, such that the fins taper inward as they extend radially inward towards the center of the channel 24.

The insert 10 may be provided with end caps 50. Each of the end caps 50 is located at a respective end of the insert 10, about the associated opening 40, 42. Each end cap 50 is substantially tubular and has an outer diameter substantially equal to that of the insert 10. Accordingly, each end cap 50, when affixed to an end of the insert 10, forms an extension of the insert 10, including the channel 24. In the embodiment shown, the insert 10 defines a radially inner step 46 that interlocks with an radially outer step 52 formed within each end cap 50, to align the end cap 50 in place on the end of the insert 10. Each end cap 50 further includes an inner surface 54 that lines up with the inner surface 28 of insert side wall 22 to create an extension of the channel 24. As shown, the inner surface 28 of each end cap 50 tapers in a conical path as it extends outward in the axial direction and away from the insert 10 and towards an outer end 56 of each end cap 50. Accordingly, the cross sectional flow area at the outer end 56 of each end cap is limited, and in particular may be limited to a value equal to the cross sectional flow area at or near the axial center of the insert 10. This prevents the cross sectional flow area from being abruptly reduced at the center of the insert 10, as a result of the fins 30 projecting into the melt flow.

Straight fins 30, such as those shown in FIG. 1, may be employed in inserts where heat redistribution is desired within the molding material, for example by way of the fins 30 acting has a heat sink—transferring heat from the periphery of the bore inwards towards the center of the molding material.

FIGS. 2-7 show another embodiment of an insert 110 according to the invention. The embodiment of FIGS. 2-7 is similar to that of FIG. 1, and only the differences will be described in detail.

In the insert 110 of FIGS. 2-7, the fins 130 extend in helical/spiral paths about the inner surface 128 of the side wall 122 of the tubular body 120, which includes an outer surface 126 having a channel 1214 therethrough, and radially inner surface 128. The tubular body at its ends may include steps 146. In particular, each of the fins 130 commences at a first end located at a first opening 140 of the insert 110, having a first angular position 160, and extends in the axial direction of the insert 110 in a curved path, such that it has a second angular position 162, different from the first angular position 160, when it reaches the second end located at the second opening 142 of the insert. Each of the fins 130 may further be divided into an inner segment 132, which is located between first and second outer segments 134A, 134B. In the embodiment shown, the first and second angular positions 160, 162 are separated by approximately 90°, but the fins 130 could undergo a greater or lesser degree of spiraling between the ends of the insert, depending on the degree of melt rotation desired. The embodiment of FIGS. 2-7 includes two fins 130, evenly spaced about the circumference of the inner surface 128, i.e., separated by 180°, but in other embodiments, the number of fins 130 and degree of rotational separation could be varied.

An insert having fins 130 that extend in spiral paths such as those shown in FIGS. 2-7 could be employed where the combination of heat uniformity and heat redistribution is desired, as described above, as well as where it is desired to rotate the molding material, for example to encourage filling of one or more mold cavities at a uniform rate. The degree of melt rotation can be varied by varying the angular rotation of the fins 130.

FIGS. 2-6 show an insert 110 having spiral fins without end caps, and FIG. 12 shows such an insert having end caps 150 having end cap radially outer steps 152 that engage the radially inner steps 146, similar to the end caps 50 shown in FIG. 1. The end caps 150 include an outer end 154 and inner surface 156.

The insert of FIGS. 2-7 could be placed at various locations within a molding assembly. For example, FIGS. 8-16 show various examples of a heated runner manifold 112 and heated nozzle body 114 in which one or more inserts 110 have been placed at various locations within the assemblies. A suitable location for the insert 110 may be selected based upon the locations and desired degree of melt rotation, which could be determined by one of ordinary skill in the art.

FIG. 14 shows how additional rotation may be achieved by placing multiple inserts 110a, 110b, 110c in the flow path. In this way, at each of the inert 110a, 110b, 110c locations, the flow may be rotated.

Alternatively, the inserts may be used for mixing of the molten molding material, rather than rotation. This may be achieved, for example, by placing the multiple inserts adjacent to each other with their fins spiraling in opposite directions, i.e. by inverting one of the inserts, as shown in FIGS. 15 and 16, which each show a first insert 110d with fins 130 rotating in a first direction, placed in series with a second insert 110e with fins 130 rotating in a second direction, opposite the first direction.

FIGS. 17-19 show another embodiment of an insert 210 according to the invention. This embodiment of the insert 210 may be used, for example, in a cold runner molding assembly. In cold runner molding, the runners are kept at the same temperature as the molds. The cold runner system includes either two or three bodies or plates within the mold. The two plate system is the simplest, but requires an ejection system to remove both the runner and the part from the mold. The three plate system enables the part to be ejected separately from the runner, since the runner is on a separate plate from the rest of the part. The three plate molds allow for flexibility in the design. In the cold runner system, it is important that the dimension of the runner be larger than the part. This will ensure that the material fills the part properly and that the mold is not under filled.

As shown, the insert 210 of FIGS. 17-19 includes a two piece body 220 including a first half body 222A and a second half body 222B. First and second half bodies 222A, 222B fit together to define a channel 224 configured for passage of molding material. In use, the insert 210 is placed within a molding machine at a location at which the molten molding material passes through the channel 224. The first and second half bodies 222A, 222B may be releasably fastened together using suitable fastening means. In the illustrated embodiment, the half bodies 222A, 222B define aligned through holes 264 and threaded holes 266 for receiving fasteners, such as screws or bolts.

As shown, the insert 210 includes a plurality of fins 230. Each of the fins 230 extends inward from inner surface 228 of the channel 224, towards the longitudinal axis X of the channel 224. In the embodiment shown, two fins 230 are provided, with one being formed on each of the half bodies 222A, 222B, and the fins 230 may be evenly spaced about the circumferences of the inner surface 228, for example, separated by 180°.

As shown, each of the fins 230 may be divided into an inner segment 232, which is located between first and second outer segments 234A, 234B. Inner segment 232 may have a substantially constant height as it extends along the axial direction of the insert 210. Outer segment 234A begins at the first opening 240 and increases in height as it moves in a direction towards the inner segment 232. Likewise, outer segment 234B begins at second opening 242 and increases in height as it moves in a direction towards the inner segment 232. The fins 230 may further have widths at their bases that are greater than the widths measured near their top surfaces 236, such that the fins taper inward as they extend radially inward towards the center of the channel 224.

As shown, in the insert 210 of FIGS. 17-19, the fins 230 extend in curved spiral paths about the inner surface 228. In particular, each of the fins 230 commences at a first end located at a first opening 240 of the insert 210, having a first angular position 260, and extends in the axial direction of the insert 210 in a curved path, such that it has a second angular position 262, different from the first angular position 260, when it reaches the second end located at the second opening 242 of the insert. In the embodiment shown, the first and second angular positions 260, 262 are separated by a rotational angle, for example 45°, but the fins 230 could undergo a lesser degree of spiraling between the ends of the insert, depending on the degree of melt rotation desired.

An insert having fins 230 that extend in spiral paths such as those shown in FIGS. 17-19 could be employed where it is desired to rotate the molding material, for example to encourage filling of one or more mold cavities at a uniform rate. The degree of melt rotation can be varied by varying the angular rotation of the fins 230.

FIGS. 20-24 show yet another embodiment of the invention where fins such as those shown any of the embodiments described above, could be formed integrally within various mold components rather than being provided in a separate insert that is affixed within the mold. In each of these embodiments, a heated manifold block 612 and heated nozzle body 614 define a channel 624 for passage of molten material, and one or more fins 330 extend inward from an inner surface of the channel. Various types of mold components can be employed and the fins 630 provided at various locations. FIGS. 19-24 each show examples including three fins 630, but more or fewer fins 630 may be employed depending on the desired effect. FIGS. 19-24 show examples having straight fins, though spiral fins such as those described above could be formed integrally within the mold components in a similar manner.

As best seen in FIG. 24, material enters the hot runner system through a spherical machine nozzle seat 616 having an orifice 618 of various diameters. It then flows through the hot runner manifold 612 in the manifold open channels 620 or passageways therein. At the end of each of the manifold flow channels 620 are hot nozzles 614 affixed to the underside of the manifold 612. The material then leaves the manifold 612 and enters the first opening 622 in the hot nozzles 614. From there, the material flows through the hot nozzle 614 in its' flow channel 624 and exits at a second opening 626 of significantly smaller diameter then the flow channel 624, at the opposing end of the nozzle 614. Typically, the material exiting the nozzle 614 flows directly into a hollow cavity in the mold to form the part, but on occasion, the material enters a hollow cavity in the mold, referred to as the cold runner system, where it continues into the hollow cavity for the part.

While the invention has been described with reference to the embodiments above, a person of ordinary skill in the art would understand that various changes or modifications may be made thereto without departing from the scope of the claims.

The invention claimed is:

1. In a molding machine that directs a melt stream of molten molding material toward a mold cavity, an improved flow path construct that operates to equalize temperature variations in said melt stream, said improved flow path construct comprising:
   a material flow channel through which said melt stream flows when progressing toward said mold cavity, said material flow channel having an inner surface, an unrestricted section and a restricted section, wherein said unrestricted section has a first cross-sectional flow area and said restricted section has a reduced second cross-sectional flow area;
   said restricted section of said material flow channel progresses along a straight central axis between a first end and an opposite second end, wherein a plurality of fins extend into said material flow channel from said inner surface, wherein said plurality of fins are identical and are symmetrically disposed around said straight central axis;
   wherein each of said plurality of fins has a base affixed to said inner surface and a top surface facing said straight central axis, said plurality of fins defining an open central channel around said straight central axis, whereby said melt stream passing through said restricted section flows through said open central channel and between said fins;
   a first conical section interposed within said material flow channel between said unrestricted section and said first end of said restricted section, wherein said first conical section has a taper that widens from said unrestricted section to said first end of said restricted section; and
   a second conical section interposed within said material flow channel between said second end of said restricted section and said unrestricted section, wherein said second conical section has a taper that narrows from said second end of said restricted section to said unrestricted section.

2. The flow path construct according to claim 1, wherein said first conical section and said second conical section have minimum cross-sectional flow areas that equal said second cross-sectional flow area of said restricted section.

3. The flow path construct according to claim 1, wherein said bases of said plurality of fins are parallel to said straight central axis.

4. The flow path construct according to claim 1, wherein said bases of said plurality of fins follow a helical progression about said straight central axis.

5. The flow path construct according to claim 1, wherein said each of said plurality of fins has a first segment along said top surface that progresses at a constant distance from said straight central axis.

6. The flow path construct according to claim 5, wherein each of said plurality of fins has a curved segment on said top surface that extends from said inner surface to said first segment.

7. The flow path construct according to claim 1, wherein each of said plurality of fins tapers from a first width at said base to a narrower second width at said top surface.

8. The flow path construct according to claim 1, wherein more than one of said restricted areas are disposed in said material flow channel.

9. The flow path construct according to claim 1, wherein said restricted section is contained in an insert that can be selectively added and removed from said material flow channel.

10. In a molding machine that directs a melt stream of molten molding material toward a mold cavity, an improved flow path construct that operates to equalize temperature variations in said melt stream, said improved flow path construct comprising:
   a material flow channel through which said melt stream flows when progressing toward said mold cavity, said material flow channel having an inner surface, an unrestricted section and a restricted section, wherein said unrestricted section has a first cross-sectional flow area and said restricted section has a reduced second cross-sectional flow area;
   said restricted section of said material flow channel progresses between a first end and an opposite second end, wherein a plurality of fins extend into said material flow channel from said inner surface;
   a first conical section interposed within said material flow channel between said unrestricted section and said first end of said restricted section, wherein said first conical section has a taper that widens from said unrestricted section to said first end of said restricted section.

11. The flow path construct according to claim 10, further including a second conical section interposed within said material flow channel between said second end of said restricted section and said unrestricted section, wherein said second conical section has a taper that narrows from said second end of said restricted section to said unrestricted section.

12. The flow path construct according to claim 10, wherein said restricted section has a first cross-sectional flow area and said first conical section has a minimum cross-sectional flow area that equals said first cross-sectional.

\* \* \* \* \*